United States Patent Office.

JOHN JAMES LUNDY, OF LEITH, NEAR EDINBURGH, GREAT BRITAIN.

Letters Patent No. 113,679, dated April 11, 1871; antedated April 4, 1871.

IMPROVEMENT IN LUBRICATING WOOL DURING THE PROCESS OF MANUFACTURE.

The Schedule referred to in these Letters Patent and making part of the same.

I, JOHN JAMES LUNDY, of Leith, near Edinburgh, in the county of Midlothian, North Britain, have invented an Improved Compound for the Lubrication of Wool and other similar Animal Substances in their Processes of Manufacture, of which the following is a specification.

My said invention has for its object the production of a compound suitable for employment in the spinning or carding of wool or other animal fibers; and this compound is obtained by acting upon oil or oils, such, for example, as gallipoli or olive-oil, recovered wool-oil, or other suitable oil or oils with a solution of a hydrated oxide of sodium, (NaO or NaHO,) commonly known as caustic soda, so that a partial saponification of the fatty acids shall be effected, and that glycerine and other unsaponified constituents shall exist in a free state so as to act as lubricants of the wool or other animal fibers.

In carrying out this invention I first add to the oil to be operated upon a solution of caustic soda, marking by preference about sixty-nine degrees of Twaddell, or having a specific gravity of about 1.345.

After agitation so as to insure thorough incorporation, I gradually add to the mixture such an amount of water as will cause the result of such partial saponification to remain in a fluid or semi-fluid condition, the proportion of water varying according to the purpose to which the product is to be applied.

The proportion in which olive-oil or other of the before-mentioned saponifiable oils are to be employed in conjunction with caustic soda will be dependent upon the degree or amount of saponification it is desired to obtain. I have, in practice, obtained good results by the employment of about three gallons of oil to about one quart of a solution of caustic soda of the density before mentioned; but I do not limit myself to these proportions, as others may be employed. The product thus resulting should then be diluted with about thirty gallons of water; but, as before mentioned, this proportion may be varied according to the fiber to be operated on.

The wool or other animal fiber, before being submitted to the willeying or carding-machine, may be sprinkled with this preparation in a manner similar to that now adopted when oil or oil and water are employed, as is well understood.

Having now described and particularly ascertained the nature of my said invention, and the manner in which the same is or may be used or carried into effect, I would observe in conclusion, that

What I claim as my invention is—

The manufacture or production of partially-saponified oils, prepared substantially in the manner hereinbefore described, and their use as an improved lubricant for carding and spinning wool and other animal fibrous material.

In testimony whereof I have signed my name to this specification in the presence of two subscribing witnesses.

JOHN J. LUNDY.

Witnesses:
   GEO. PITTENDRIGH,
      20 *Elbe Street, Leith.*
   ANDREW H. WYLIE,
      10 *Maitland Street, Trinity.*